United States Patent

[11] 3,614,587

| | | |
|---|---|---|
| [72] | Inventor | Francis C. Schwarz<br>Weston, Mass. |
| [21] | Appl. No. | 60,202 |
| [22] | Filed | July 1, 1970 |
| [23] | | Division of Ser. No. 775,870, Nov. 14, 1968,<br>Pat. No. 3,539,905 |
| [45] | Patented | Oct. 19, 1971 |
| [73] | Assignee | The United States of America as<br>represented by the Administrator of the<br>National Aeronautics and Space<br>Administration |

[54] SATURATION CURRENT PROTECTION APPARATUS FOR SATURABLE CORE TRANSFORMERS
7 Claims, 3 Drawing Figs.

[52] U.S. Cl. ................................................ 321/2,
321/14, 321/19, 321/25, 323/56, 323/89 C
[51] Int. Cl. ...................................................... H02m 7/52,
H02p 7/14, G05f
[50] Field of Search .......................................... 321/2, 11,
12, 25, 45 R, 14; 331/113 A; 323/56, 89 C;
324/127

[56]  References Cited
UNITED STATES PATENTS

| 3,504,263 | 3/1970 | Schaefer ....................... | 321/2 |
| 3,523,235 | 8/1970 | Schaefer ....................... | 321/2 |
| 3,541,428 | 11/1970 | Schwarz ....................... | 321/25 X |
| 3,562,623 | 2/1971 | Farnsworth .................. | 321/2 |

Primary Examiner—William H. Beha, Jr.
Attorneys—John R Manning, N. T. Musial and J. A. Mackin ABSTRACT: This disclosure describes a saturation current protection apparatus for saturable core transformers. A cut core (airgap) transformer detects the occurrence of rapidly increasing magnetic current in the saturable core transformer. When a rapidly increasing current condition occurs, the cut core transformer applies a suitable signal to a switching means. The switching means terminates the application of current to the saturable core transformer to protect it from an undesirable over current condition INVENTOR
Francisc C. Schwarz INVENTOR
Francisc C. Schwarz

SATURATION CURRENT PROTECTION APPARATUS FOR SATURABLE CORE TRANSFORMERS

CROSS REFERENCE TO RELATED APPLICATIONS

The invention described herein relates to a pulse-width modulated DC—DC conversion system and is a division of application Ser. No. 775,870, filed Nov. 14, 1968, now U.S. Pat. No. 3,539,905.

BACKGROUND OF THE INVENTION

Both airgap transformers and saturable core transformers have found widespread use. For example, both transformers have been utilized in inverter circuits. In recent years, the air core transformer has been replaced by the saturable core transformer in many inverter and other electronic circuits because when an airgap transformer is switched, a large amount of destructive energy is dissipated. Specifically, a substantial part of the energy stored in the airgap is dissipated in the relative elements of the circuit that is opened by the switching means. The majority of this energy is dissipated in the largest of the series resistive elements of the circuit, which is usually the apparent resistance of the opening of the switching element. The dissipation of the energy formerly stored in the airgap of the transformer core is proportional to the frequency of operation and contributes greatly to the heating of the switching element. Hence, the higher the frequency, the greater the heating effect, and the greater the heating effect, the greater the likelihood of switch breakdown. Consequently, because of this frequency proportionality the operative frequency of an airgap transformer circuit is greatly limited. A second disadvantage of airgap transformers is that they are less efficient then saturable core transformers for the aforesaid reasons, and because airgap transformer cores are not available in the most efficient materials.

While the use of saturable core transformers in inverter and other electronic circuits has certain advantages, it also has certain disadvantages. A primary disadvantage of saturable core transformers is that the BH-loop of an uncut core will not necessarily center around the origin of the BH coordinates. The slightest DC imbalance in the circuit causes the BH-loop to incorporate one of the saturable levels of the core material. The DC imbalance can be caused by a difference in the switching elements, a difference in the resistance in the primary windings or an imbalance between alternating cycles, for example. Saturation of the magnetic core material due to an imbalance deprives the individual primary circuits of essentially all of their series impedance and results in rapidly increasingly short circuit currents. These short circuit currents cause substantial power losses and may eventually cause system breakdown by fatally damaging the switching elements. For this reason, the use of saturable transformers has not been as widespread as it could be. As a matter of fact, many circuits wherein a saturable core transformer could be used have not used them because of their disadvantages. Compromises have been made which have required these circuits to accept the frequency limitations of airgap transformers and their increased weight.

New saturable core transformer inverters and other electronic circuits have been developed that attempt to overcome the saturation problem. These circuits operate on the philosophy that if switching is controlled by saturation, undesirable short circuit currents will not occur. That is, the circuits normally comprise saturable core transformer having at least two primary windings—one sense winding and one power winding. The sense winding senses saturation and stops the application of power to the power winding when saturation occurs. Alternatively, a pair of sense and a pair of power windings may be provided. Then, when saturation occurs in one direction, the switching means switches the power from one power winding to the other power winding. Normally, the switching means is a solid state switching means such as a transistor.

While inverters and other electronic circuits of the foregoing nature have found widespread use, they possess certain inherent and significant disadvantages. Specifically, the core saturation process consumes a relatively small, but finite, time interval at moderate frequencies of operation. When the frequency of operation increases, the duration of the core saturation process becomes comparable to the time constants governing the switching components. The problem of delayed current turnoff is further compounded because the signal that energizes the switching means is maintained on during the saturation process of the transformer core as long as the magnetic flux continues to change. This means that the switch is closed during the interval in which the magnetic flux density follows the knee of its BH-loop towards saturation and remains closed until a lapse of the involved time constants permit the removal of the signal and the subsequent opening of the switch. A short circuit current builds up during these intervals and creates heat. The heating effect is tolerable as long as the number of events per unit time (frequency of operation) is moderate. However, if the transition interval toward magnetic core saturation becomes comparable to the duration of one cycle of operation, then the corresponding cumulative heat dissipation and power loss become unacceptable.

It will be appreciated from the foregoing discussion that airgap transformers and saturable core transformer circuits have found widespread use. However, both of these transformers have circuit disadvantages which make them unacceptable in certain environments. The primary disadvantage of these transformer circuits is that conditions can be created wherein they are subject to failure.

Therefore, it is n object of this invention to provide a saturation current protection apparatus for saturable core transformers that is faster reacting than prior art protection apparatus.

It is another object of this invention to provide an apparatus for protecting saturable core transformers from saturation currents wherein a means is included for the early detection of rapidly increasing magnetic currents so that the occurrence of short circuit currents can be prevented.

It is a further object of this invention to provide an apparatus for protecting saturable core transformers from undesirable short circuits that is operable at high frequencies.

SUMMARY OF THE INVENTION

In accordance with a principle of this invention, an apparatus for protecting saturable core transformers from saturation currents is provided. The apparatus comprises a conventional airgap transformer connected in electric circuit with a saturable core transformer. The primary windings of the airgap transformer induce a current in the secondary winding of that transformer that corresponds to the magnetizing current in the primary windings alone. When saturation currents start to exist in the saturable core transformer, then this induced current caused by the aforesaid magnetizing current will exceed a preset threshold level. The resulting signal is utilized through a switching means to control (i.e., turn off) the application of power to the primary winding of the saturable core transformer creating the saturation currents.

In accordance with another principle of this invention, the saturable core transformer has a pair of primary windings and a single secondary winding and is adapted to invert DC current. The airgap transformer has its primary windings connected so as to sense the application of power to the windings of the saturable core transformer. A switching means is provided that is adapted to switch power from one winding to the other winding of the saturable core transformer. And, the sense windings of the airgap transformer are connected to the switching means so as to provide a switching signal to the switching means. The switching signal occurs when saturation is impending in one direction or the other in the saturable core transformer. The switching signal causes the switching means to switch the direction of power application to the primary windings of the saturable core transformer.

In accordance with yet another principle of the invention, an independent means is connected to the switching means to control the switching means. In addition, the switching means receives a signal relating to the occurrence of saturation. The switching means is adapted to prevent the application of power when a saturation condition occurs, even though the independent switching means indicates that power should still be applied. In this manner, the invention is used to provide a pulse-modulated saturable core transformer inverter that inverts a DC signal in accordance with a particular pulse repetition rate, but includes means to prevent short circuit currents from occurring in the saturable core transformer performing the inversion.

From the foregoing it will be appreciated that the invention provides an apparatus for protecting saturable core transformers from short circuit currents. The invention is rather uncomplicated in that it requires only an airgap transformer connected in circuit with a saturable core transformer and a switching means for controlling the application of power to the primary windings of the saturable core transformer. The invention is faster reacting than prior art apparatus, because it senses the occurrence of an impending short circuit condition as opposed to sensing the actual saturation of the transformer. Hence, inverters or other electronic circuits utilizing the invention can operate at much higher frequency rate than prior art circuits and systems. In addition, the primary cause of heat generation is eliminated, making circuits using the invention more reliable and less likely to be destroyed by heat.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
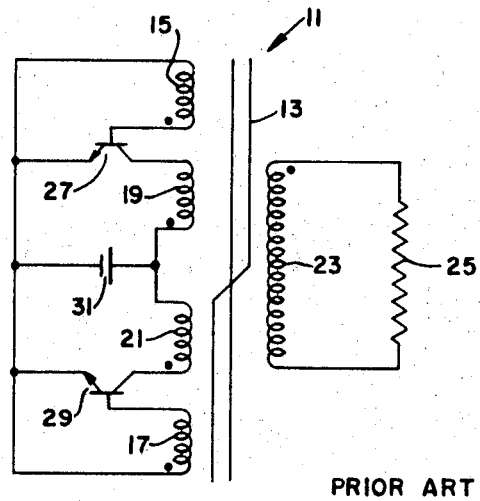
FIG. 1 is a schematic diagram of a prior art saturable core inverter.

FIG. 1 illustrates a general prior art inverter incorporating a saturable transformer and comprising a saturable transformer 11 including a saturable core 13, a pair or primary sense windings 15 and 17, a pair of primary power windings 19 and 21, and a secondary winding 23. Conventional "dots" are illustrated adjacent to the various windings so that current flow can be determined at any instant in a cycle of operation. A load 25 is connected across the secondary winding 23. The primary circuit of the inverter includes a pair of NPN transistors 27 and 29 and a DC power source 31.

The positive side of the battery is connected to one end of each of the primary power windings 19 and 21. The other end of the first primary power winding 19 is connected to the collector of the first transistor 27. The base of the first transistor 27 is connected to one end of the first primary sense winding 15. The other end of the first primary sense winding is connected to the emitter of the first transistor 27 and to the negative terminal of the DC power source 31. Similarly, the other end of the second primary power winding 21 is connected to the collector of the second transistor 29 and the base of the second transistor 29 is connected to one end of the second primary sense winding 17. The other end of the second primary sense winding 17 is connected to the emitter of the second transistor and to the negative terminal of the DC power source 31.

A prior art inverter of the type illustrated in FIG. 1 is well known and operates in a conventional manner. One sense winding is energized by magnetic coupling caused by current flow in its related power winding. This sense winding keeps its transistor in an "on" condition as long as current magnetic coupling exists. When saturation occurs, magnetic coupling ends and current ceases to flow in the sense winding; hence, the transistor connected to that winding is turned "off." Immediately thereafter, current flows in the other sense winding due to the collapse of the magnetic field. This sense winding current turns the second transistor on and allows power to flow through its primary power winding. This cyclic relationship continues to repeat and inverts the DC power provided by the DC power source 31. The inverted power is sensed by the secondary winding 23 and applied to the load 25.

The primary disadvantage of a circuit of the type illustrated in FIG. 1 is that saturation controls switching and, because saturation controls switching, the circuit is frequency limited. More specifically, the core saturation process which controls switching consumes a relatively small, but finite, time interval at moderate frequencies of operation. When the frequency of operation increases, the duration of the core saturation process becomes comparable to the time constant of the switching transistors. Hence, there is a delayed turnoff because of the time constant of the switching transistors. The problem of delayed current turnoff is further compounded, because the signal that energizes the transistors is maintained on during the saturation process of the transformer core as long as the magnetic flux continues to change in one direction. This means that the transistor is maintained on during the interval in which the magnetic density follows the knee of the BH-loop of the saturable core and remains on until a lapse of the involved time constants permits removal of the signal from the related sense winding and the subsequent opening of the transistor switch. During these intervals, a short circuit current builds up in the transformer and the transistor and creates heat. This heat, when the frequency is sufficiently high, can cause circuit component breakdown. The invention, as hereinafter described, provides a means for protecting the saturable core transformer by preventing the undesirable short circuit current condition, and its destructive effects, from occurring.

Figure 2:
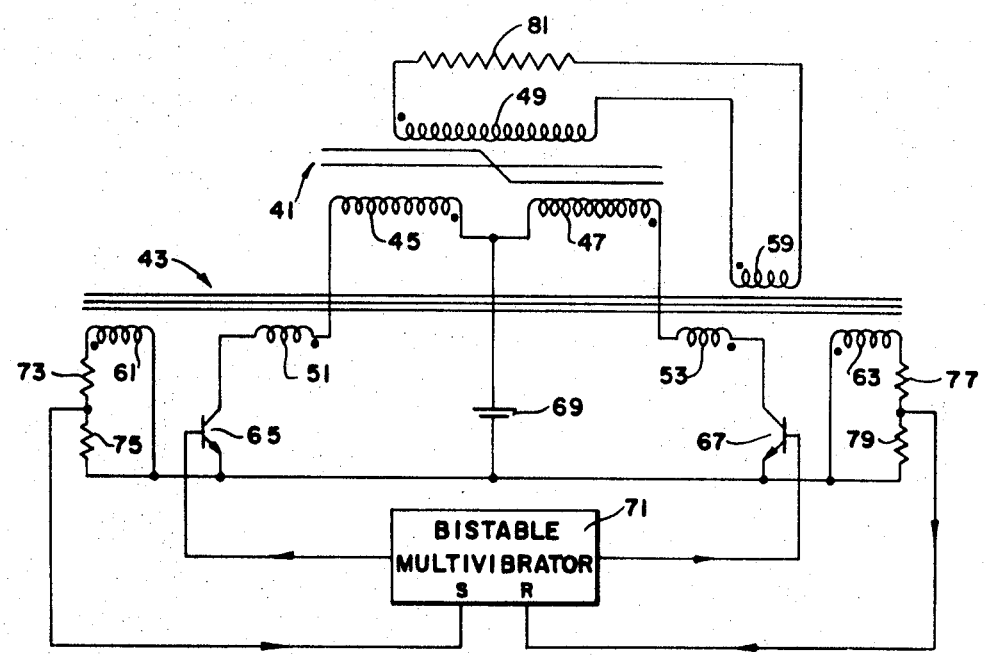
FIG. 2 is a schematic diagram of an inverter incorporating this invention.

FIG. 2 is a schematic diagram illustrating an inverter of the type generally illustrated in FIG. 1 that includes the saturation current protection apparatus of the invention. The circuit illustrated in FIG. 1 includes a saturable core transformer 41 and a conventional airgap core transformer 43. The saturable core transformer 41 includes a pair of power primary windings 45 and 47 joined at their center so that a split primary winding is provided. In addition, the saturable core transformer 41 includes a secondary winding 49. The airgap transformer 43 includes three primary windings 51, 53, and 59, and a pair of secondary windings 61 and 63. The circuit illustrated in FIG. 2 also includes a first transistor 65, a second transistor 67, a DC power source 69, a bistable multivibrator 71, and four resistors 73, 75, 77 and 79.

The first power winding 45 of the saturable core transformer is connected in series with the first primary winding 51 of the airgap transformer and the collector-emitter terminals of the first transistor 65 across the terminals of the DC power source 69. Similarly, the second power winding 47 of the saturable core transformer is connected in series with the second primary winding of the airgap transformer 43 and the collector-emitter terminals of the second transistor 67 across the terminals of the DC power source 69. The secondary winding 49 of the saturable core transformer 41 is connected in series with the third primary winding 59 of the airgap transformer 53 across the load 81.

One end of the first secondary winding 61 of the airgap transformer is connected to the emitter of the first transistor 65. The other end of the first secondary winding of the airgap transformer is connected through the first resistor 73 connected in series with the second resistor 75 to the emitter of the first transistor 65. The junction between the first and second resistors is connected to the set input of the bistable multivibrator 71.

One end of the second secondary winding 63 of the airgap transformer is connected to the emitter of the second transistor 67 and the other end of the second secondary winding is connected through the third resistor 77 connected in series with the fourth resistor 79 to the emitter of the second transistor 67. The junction between the third resistor and the fourth resistor is connected to the reset input of the bistable multivibrator 71. One output of the bistable multivibrator 71 is connected to the base of the first transistor 65 and the second output of the bistable multivibrator 71 is connected to the base of the second transistor 67.

The inverter illustrated in FIG. 2 operates in a somewhat conventional manner. That is, one of the transistors is switched on and a current flows in that transistor's collector-emitter loop. This current flow induces a current in the secondary winding of the saturable core transformer and that current is applied to the load 81. The primary difference is that the transistor "on" signal is derived from a sense winding through a bistable multivibrator rather than directly from a sense winding. And, that sense winding is part of an airgap transformer rather than part of the saturable core transformer. However, even with these differences the circuit operates the same as a normal inverter circuit as far as inversion is concerned. When a switching signal occurs, the bistable multivibrator turns the previously on transistor off and the other transistor on. Thereafter, current flows in the other transistor's loop and induces current in the opposite direction in the secondary winding of the saturable core transformer 41. Hence, cyclic operation is provided.

As stated above, the primary difference between the prior art inverter illustrated in FIG. 1 and the inverter of the invention illustrated in FIG. 2 is that the sense signals are derived from different sources. That is, the sense signals that control switching are derived in FIG. 1 from the saturable core transformer, whereas the sense signals that control switching in FIG. 2 are derived from the airgap transformer 43.

The sense signals of the inventive inverter are created by current flow in the primary windings of the airgap transformer. That is, the combination of current flow created by the current flowing through the first, second and third primary windings of the airgap transformer controls a direction and magnitude of magnetization of the core of the airgap transformer. The direction of magnetization determines which of the two secondary windings is given a trigger signal with appropriate polarity to change the state of the bistable multivibrator. And, the magnitude determines the magnitude of the trigger-switching signal. As hereinafter described, the trigger signal occurs when a short circuit current is in the incipient stage in one of the primary windings of the saturable core transformer. Immediately upon the occurrence of this condition, the bistable multivibrator receives a trigger signal and switches states, thereby turning off one transistor and turning on the other transistor. Hence, there is no time delay between the occurrence of an incipient increase of magnetizing and the occurrence of a switching signal. This fast reaction prevents the short circuit condition from building up to an undesirable level where heat and power efficiency losses are created.

To better understand the invention, the following theory of operation is provided. Currents flowing in the primary windings of the saturable core transformer are the same that flow in the first and second primary windings 51 and 53 of the aircore transformer. The alternating magnetizing forces that these currents generate are at all times opposed by the magnetizing force generated by the third primary winding 59 of the airgap transformer. If the turns ratio of either of the first or second primary windings is equal to the turns ratio of the third primary winding and the turns ratio of the first or second power windings of the saturable core transformer are equal to the turns ratio of the secondary winding of the saturable core transformer, then all magnetizing forces applied to the core of the airgap transformer will cancel, except for the magnetizing current components of the primary inverter currents. This result also holds true if there is a necessary turns ratio relationship as opposed to an exact equality. The net magnetizing force applied to the core of the airgap transformer is then solely due to the alternating magnetizing current components of the saturable core transformer. That is, the magnetizing force is due to the magnetizing current flow in the primary inverter circuit.

The magnetizing current of the saturable core transformer is—as a rule—one or more orders of magnitude smaller than the load currents of the saturable core transformer. Preferably, the number of turns of the primary windings of the airgap transformer are chosen as unity when large currents are associated with the saturable core transformer. Hence, the EMF generated by one of these turns in the secondary winding of the airgap transformer is small. Amplification of this small EMF signal is achieved by forming the secondary windings of an appropriate number of turns. This means that while EMF is increased, the signal current is stepped down by a ratio determined by the winding ratio. The ratio is chosen so that a trigger signal of a desired voltage level is generated when the magnetizing current of the saturable core transformer in the presence of its unsaturated core exceeds in magnitude an arbitrary multiple during the transition of the core toward the saturated state. When this EMF is generated, the airgap current transformer sense winding loop emits a trigger signal that is a multiple of the signal corresponding to the normal magnetizing current. Hence, the trigger signal is related to the incipient stages of saturation in the saturable core transformer.

The trigger signal generated by the sense winding loop is applied to the appropriate terminal of the bistable multivibrator 71 and changes its state. This change in state turns off the previous on transistor and turns on the previous off transistor. Due to the winding relation illustrated by the dots, the switching of the state of the bistable multivibrator reverses the direction of the magnetizing force applied to the saturable core transformer. Thereafter, the saturable core transformer is magnetized in the opposite direction. And, when it reaches the incipient stages of saturation in that direction, a trigger signal is emitted by the other secondary winding loop of the airgap transformer which switches the state of the bistable multivibrator to its initial state. In this manner, the cyclic operation is provided.

It will be appreciated by those skilled in the art and others that the trigger signals are emitted well in advance of the saturation of the saturable core transformer. If the BH-loop of a square loop core material is expanded in its direction of magnetic flux density and if the area of interest is restricted to one of the saturation processes, then it will be readily recognized that the trigger signals are emitted after an insignificant increase of the primary currents. Hence, destructively high short circuit currents never occur.

It will also be appreciated that the advantages of this apparatus is rooted in its philosophy of detection of the impending saturation of the saturable core transformer well in advance of actual saturation and at a time when the increase in primary currents is also nonnoticeable. This advantage is contrasted by the prior art apparatus which requires as a fundamental necessity essentially completion of the saturation processes with the resulting short circuit currents.

It will also be appreciated that since the course of magnetization of the saturable core material is reversed whenever saturation is impending, this invention protects the circuit under other than normal operating conditions, That is, the invention protects the switching means from harmful saturation currents at any time including transient starting voltages, step changes in source and/or load voltages and other similar conditions.

Figure 3:
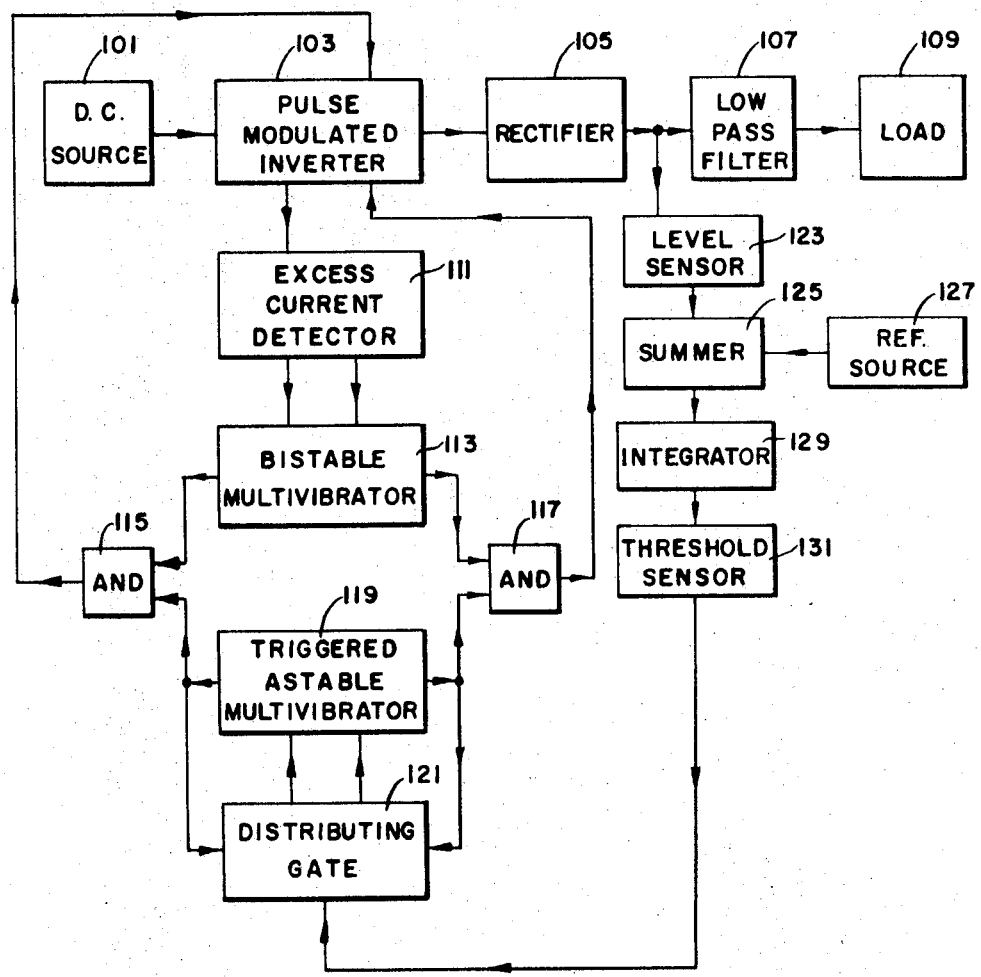
FIG. 3 is a block diagram of a pulse-modulated inverter incorporating this invention.

FIG. 3 is a block diagram illustrating a saturation current protection apparatus of the type herein described in a pulse-modulated inverter. The block diagram illustrated in FIG. 3 comprises: a DC power source 101; a pulse-modulated inverter 103; a rectifier 105; a low-pass filter 107; a load 109; an excess current detector 111; a bistable multivibrator 113; first and second AND-gates 115 and 117; a triggered astable multivibrator 119; a distributing gate 121; a level sensor 123; a summer 125; a reference source 127; an integrator 129, and a threshold sensor 131.

The output from the DC power source 101 is connected to the power input of the pulse modulator inverter 103. The output of the pulse-modulated inverter is connected through the rectifier 105 to the input of the low-pass filter 107 and the input of the level sensor 123. The output of the low-pass filter is connected to the input of the load 109. The output of the level sensor 123 is connected to one input of the summer 125 and the second input of the summer is connected to the output of the reference source 127.

The output of the summer 125 is connected through the integrator 129 to the input of the threshold sensor 131. The output of the threshold sensor 131 is connected to one input of the distributing gate 121. The distributing gate 121 has two outputs which are connected to the trigger inputs of the triggered astable multivibrator 119. Two outputs of the trigger astable multivibrator are connected each to one input of the distributing gate 121 and one input of one of the AND-gates 115 or 117.

The pulse-modulated inverter 103 has a sense output that is connected to the input of the excess current detector 111. The excess current detector has a pair of outputs that are connected to the set and reset inputs, respectively, of the bistable multivibrator 113. The two outputs of the bistable multivibrator 113 are separately connected to second inputs of the two AND-gates 115 and 117. The outputs of the two AND-gates 115 and 117 are connected to separate inputs of the pulse-modulated inverter 103.

It will be appreciated by those skilled in the art and others that the pulse-modulated inverter system illustrated in FIG. 3 is a conventional pulse-modulated inverter, except for the addition of the excess current detector 111, the bistable multivibrator 113 and the AND-gates 115 and 117. The conventional components operate so that the output of the DC source 101 is inverted by the pulse-modulated inverter 103. The output is rectified, filtered and applied to a load 109. In addition, the output is sensed and compared in the summer 125 with a reference source signal from the reference source signal 127. The output of the summer is integrated and applied to the threshold sensor 131. When the threshold detector receives an input signal of a particular level, it generates an output signal that is applied to the distributing gate 121.

At the time the distributing gate receives a pulse from the threshold sensor 131, it is also receiving a signal from one of its lines connected to the astable multivibrator 119. These two pulses are compared by the distributing gate and a trigger signal is applied along one of the output lines of the distributing gate to the triggered astable multivibrator 119. Which of the two applies the pulse to the triggered astable multivibrator is determined by the prior state of the triggered astable multivibrator so that the new trigger pulse from the distributing gate switches the triggered astable multivibrator to its opposite state. When this occurs, the output of the triggered astable multivibrator are switched and a pulse is applied to the opposite side of the pulse-modulator inverter.

The addition of the excess current detector, the bistable multivibrator and the AND gates vary the foregoing operation in the manner hereinafter described. Specifically, when the astable multivibrator is triggered to one state from its prior state, it does not apply a pulse to the pulse-modulated inverter unless the bistable multivibrator has previously reversed its states, That is, initially a signal from the triggered astable multivibrator is applied to one side of the pulse-modulated inverter through one of the AND gates. Which of the two AND gates passes the signal is determined by the state of the bistable multivibrator.

When the pulse-modulated inverter approaches saturation in its driven direction, the excess current detector senses the approach and applies a trigger pulse to the bistable multivibrator to change the state of the bistable multivibrator. When this state change occurs, the previously signal passing AND gate is biased "off" and the signal from the triggered astable multivibrator is no longer applied to the pulse-modulated inverter. Thereafter, the level sensor 123 senses the reduction in the output from the rectifier and applies a reduced signal to the summer. The summer compares the reduced signal with the signal from the reference source and generates an output signal which is integrated by the integrator 129. When the integrated signal reaches a predetermined level, the threshold sensor 131 generates a trigger signal and applies it to the distributing gate 121. When the distributing gate receives the trigger signal, it switches the triggered astable multivibrator to its opposite state. When this triggering occurs, the opposite AND gate from that previously passing triggered astable signals is receiving two input signals (one from the bistable and the other from the astable). Hence, the astable multivibrator signal passes through that AND gate and the pulse-modulated inverter starts to saturate in the opposite direction.

When the pulse-modulated inverter approaches saturation in the opposite direction, the excess current detector again applies a trigger signal to the bistable multivibrator causing it to switch states. When the bistable multivibrator switches states, it prevents the application of the signal from the triggered astable multivibrator to the pulse-modulated inverter. The output from the rectifier reduces and this reduction is sensed as hereinabove described. When a particular level is sensed by the threshold sensor, a further trigger signal is applied to the distributing gate and the astable multivibrator changes states. Thereafter, a pulse from the triggered astable passes through an AND gate and is applied to the pulse-modulated inverter to start saturation in the original direction.

It will be appreciated from the foregoing that the pulse-modulated inverter of FIG. 3 operates in a cyclic manner with the triggered astable multivibrator determining the initiation of saturation in one direction and the bistable multivibrator determining the end of saturation in that direction. Thereafter, when a trigger signal to the distributing gate is received from the threshold sensor, saturation starts to occur in the opposite direction until terminated by the bistable multivibrator 113.

It will be appreciated from the foregoing discussion of FIG. 3 that the invention provides a means for preventing a pulse-modulated inverter from becoming saturated in either direction. This prevention prevents the detrimental effects that occur in prior art pulse-modulated inverters due to saturation. More specifically, short circuit current conditions will not occur and create excess heat in the pulse-modulated inverter and/or the switches that are operated by the outputs from the AND gates. It should also be noted that the triggered astable controls the frequency of operation, whereas the bistable only prevents saturation.

It will be appreciated from the foregoing description of the invention that an apparatus for preventing saturation currents in saturable core transformers is provided. The apparatus is uncomplicated, merely requiring a means for sensing the initiation of saturation, such means being an airgap transformer, for example. In addition, a means, such as a bistable multivibrator, is used to control the switching of signals immediately upon the sensing of s short circuit current condition. Hence, the system is faster reacting than prior art systems, and, because it is faster reacting, this invention prevents short-circuit currents from occurring. Prevention of short circuit currents prevents the generation of excess heat and it will be appreciated that excess heat can be destructive to circuit components.

It will be appreciated by those skilled in the art and others that the foregoing description describes a preferred embodiment of the invention, but that the invention can be practiced otherwise than as specifically described. In general, the invention requires a means for sensing the start of the saturation process of the power transformer core material entailing the start of a short circuit current condition. The sensing means provides a signal that is used to control a bistable multivibrator or other similar switching means to turn off the current-causing saturation in one direction and start a current flow in the opposite direction. This switching prevents saturation and short circuit currents from occurring, thereby preventing circuit component destruction due to excess heat. While the invention has been described in an inverter environment, it will be appreciated that the invention can be used in other environments where saturable core transformers are switched by control circuits. Hence, the invention can be practiced otherwise than as specifically described herein.

I claim:

1. Pulse-modulated inverter apparatus comprising:
   a pulse-modulated inverter including a saturable core transformer;
   sensing means connected to the output of said pulse-modulated inverter for sensing the output of said pulse-modulated inverter and for generating a trigger signal when said output is at a predetermined level;
   switchable signal-generating means connected to the output of said sensing means for generating control signals for controlling the direction of saturation of said saturable core transformer;
   current sensing means connected to said pulse-modulated inverter for sensing the occurrence of rapidly increasing current in said saturable core transformer and for generating gating signals in accordance with the occurrence of said rapidly increasing current; and
   gating means connected to the output of said current sensing means and the output of said switchable signal generating means for gating the control signals generated by said switchable signal generating means to said pulse-modulated inverter in accordance with the gating signals generated by said current sensing means.

2. Pulse-modulated inverter apparatus as claimed in claim 1 wherein said current-sensing means comprises an excess current detector to said pulse-modulated inverter and a bistable multivibrator connected to the output of said excess current detector.

3. Pulse-modulated inverter apparatus as claimed in claim 2 wherein said switchable signal generating means comprises a distributing gate connected to said sensing means and a triggered astable multivibrator connected to the output of said distributing gate, said distributing gate also having inputs connected to separate outputs of said triggered astable multivibrator in addition to its input from said sensing means.

4. Pulse-modulated inverter apparatus as claimed in claim 3 wherein said gating means comprises first and second AND gates, said first AND gate connected to one output of said triggered astable multivibrator and one output of said bistable multivibrator having an input connected to said pulse-modulated inverter, and said second AND gate having one input connected to the second output of said triggered astable multivibrator and a second input connected to the output of said bistable multivibrator and having an output connected to said pulse-modulated inverter.

5. Pulse-modulated inverter apparatus as claimed in claim 4 including a rectifier connected between the output of said pulse-modulated inverter and the input of said sensing means.

6. Pulse-modulated inverter apparatus as claimed in claim 5 wherein said sensing means comprises:
   a level sensor connected to the output of said rectifier;
   a reference source;
   a summer having one input connected to the output of said level sensor and a second input connected to the output of said reference source;
   an integrator having its input connected to the output of said summer; and
   a threshold sensor having its input connected to the output of said integrator and its output connected to the input of said distributing gate.

7. Pulse-modulated inverter apparatus as claimed in claim 6 including a DC source connected to said pulse-modulated inverter and a low-pass filter connected to the output of said rectifier.